US010928923B2

(12) United States Patent
Imm et al.

(10) Patent No.: US 10,928,923 B2
(45) Date of Patent: Feb. 23, 2021

(54) APPARATUSES, SYSTEMS, AND METHODS FOR REPRESENTING USER INTERACTIONS WITH REAL-WORLD INPUT DEVICES IN A VIRTUAL SPACE

(71) Applicant: Facebook Technologies, LLC, Menlo Park, CA (US)

(72) Inventors: Andrew Harrison Imm, San Francisco, CA (US); Grantland Lee Lim Chew, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/508,285

(22) Filed: Jul. 10, 2019

(65) Prior Publication Data
US 2019/0332184 A1  Oct. 31, 2019

Related U.S. Application Data

(63) Continuation of application No. 15/717,725, filed on Sep. 27, 2017, now Pat. No. 10,394,342.

(51) Int. Cl.
*G06F 1/16* (2006.01)
*G06F 3/02* (2006.01)
(Continued)

(52) U.S. Cl.
CPC .............. *G06F 3/021* (2013.01); *G06F 3/011* (2013.01); *G06F 3/0219* (2013.01); *G06F 3/038* (2013.01);
(Continued)

(58) Field of Classification Search
CPC .............. G02B 27/017; G02B 27/0176; G02B 2027/0178; G05B 2219/32014;
(Continued)

(56) References Cited

U.S. PATENT DOCUMENTS 3,911,429 A * 10/1975 Vinal .................... G06F 3/0202
341/32
4,316,066 A * 2/1982 Muller .................... H01H 13/02
200/407
(Continued)

FOREIGN PATENT DOCUMENTS

CN  103713743 B  8/2016
CN  109559925 A  4/2019

OTHER PUBLICATIONS

Lazaridis, Giorgus, "How Touch Buttons Work", URL: http://pcbheaven.com/wikipages/How_a_Touch_Button_works/?p=O, Jan. 2, 2011, 8 pages.
(Continued)

*Primary Examiner* — Michael J Eurice
(74) *Attorney, Agent, or Firm* — FisherBroyles, LLP

(57) ABSTRACT

A key assembly for a keyboard may include a key cap that includes a touch sensor that is communicatively coupled to a control device. When the touch sensor senses a touch event, the touch sensor may send a touch signal to the control device, and when the touch sensor senses an absence of touch, the touch sensor may send a control signal to the control device. The key assembly may further include a switch that is communicatively coupled to the control device and that is movable between a pressed position and an un-pressed position. When the switch is in the pressed position, the switch may send a closed signal to the control device, and when the switch is in the un-pressed position, the switch may send an open signal to the control device. Various other apparatuses, systems, and methods are also disclosed.

20 Claims, 9 Drawing Sheets

(51) Int. Cl.
  *G06F 3/03* (2006.01)
  *G06F 3/041* (2006.01)
  *G06F 3/044* (2006.01)
  *G06F 3/01* (2006.01)
  *G06F 3/038* (2013.01)
  *G06F 3/0354* (2013.01)
  *G06F 3/045* (2006.01)
  *G06T 19/00* (2011.01)
  *G06F 3/042* (2006.01)
  *G02B 27/01* (2006.01)
  *H01H 13/70* (2006.01)
  *H01H 3/02* (2006.01)
  *H01H 11/00* (2006.01)

(52) U.S. Cl.
  CPC ........ *G06F 3/03547* (2013.01); *G02B 27/017* (2013.01); *G02B 2027/0178* (2013.01); *G05B 2219/32014* (2013.01); *G06F 1/1639* (2013.01); *G06F 1/1673* (2013.01); *G06F 1/1692* (2013.01); *G06F 3/044* (2013.01); *G06F 3/045* (2013.01); *G06F 3/0425* (2013.01); *G06F 3/0426* (2013.01); *G06F 2203/04809* (2013.01); *G06T 19/006* (2013.01); *H01H 11/0018* (2013.01); *H01H 13/70* (2013.01); *H01H 2003/0293* (2013.01); *H01H 2239/006* (2013.01)

(58) Field of Classification Search
  CPC .... G06F 1/1639; G06F 1/1673; G06F 1/1692; G06F 3/011; G06F 3/02; G06F 3/03; G06F 3/0202; G06F 3/021; G06F 3/0219; G06F 3/0224; G06F 3/023; G06F 3/0238; G06F 3/03547; G06F 3/038; G06F 3/0425; G06F 3/0426; G06F 3/041; G06F 3/044; G06F 3/045; G06F 2203/04809; G06T 19/006; H01H 3/12; H01H 3/125; H01H 11/0018; H01H 13/14; H01H 13/52; H01H 13/70; H01H 13/705; H01H 13/88; H01H 2201/036; H01H 2003/0293; H01H 2025/004; H01H 2215/05; H01H 2219/018; H01H 2219/036; H01H 2233/07; H01H 2239/006; H01H 2239/074
  See application file for complete search history.

(56) References Cited

U.S. PATENT DOCUMENTS

| | | | | |
|---|---|---|---|---|
| 4,359,612 A * | 11/1982 | Rooney | ................ | H01H 11/00 200/5 R |
| 4,529,849 A * | 7/1985 | Kamei | ............... | H01H 13/705 200/5 A |
| 4,661,005 A * | 4/1987 | Lahr | ..................... | B41J 5/105 340/407.2 |
| 4,677,600 A * | 6/1987 | Yoshida | ............ | H03K 17/967 367/127 |
| 4,712,092 A * | 12/1987 | Boldridge, Jr. | ........ | H01H 13/70 341/34 |
| 5,298,677 A | 3/1994 | Shimada | | |
| 5,367,119 A | 11/1994 | Matsuda et al. | | |
| 5,434,566 A * | 7/1995 | Iwasa | .................... | H01H 13/84 341/34 |
| 5,515,045 A | 5/1996 | Tak | | |
| 5,612,692 A | 3/1997 | Dugas et al. | | |
| 5,689,253 A * | 11/1997 | Hargreaves | ................ | B41J 5/10 341/22 |
| 5,736,976 A | 4/1998 | Cheung | | |
| 5,796,984 A | 8/1998 | Pearce et al. | | |
| 5,905,487 A | 5/1999 | Kwon | | |
| 5,980,135 A * | 11/1999 | Shih-Hung | .......... | H01H 13/702 200/344 |
| 6,005,496 A * | 12/1999 | Hargreaves | ........... | G06F 3/0202 341/22 |
| 6,288,457 B1* | 9/2001 | Kako | .................... | G06F 1/1616 200/344 |
| 6,388,657 B1* | 5/2002 | Natoli | ..................... | G06F 3/014 345/156 |
| 6,611,253 B1 | 8/2003 | Cohen | | |
| 6,630,925 B1 | 10/2003 | Östergård et al. | | |
| 6,700,508 B1* | 3/2004 | Nomura | ............... | H01H 13/702 341/27 |
| 6,720,892 B1 | 4/2004 | Lachor | | |
| 6,833,522 B1* | 12/2004 | Park | ....................... | H01H 3/125 200/17 R |
| 7,301,532 B1 | 11/2007 | Dobry | | |
| 7,978,181 B2* | 7/2011 | Westerman | .......... | G06F 3/0219 178/17 C |
| 8,935,003 B2 | 1/2015 | Itkowitz et al. | | |
| 10,325,734 B1* | 6/2019 | Iijima | ...................... | H01H 3/12 |
| 10,347,443 B1* | 7/2019 | Wu | ........................ | H01H 3/125 |
| 10,394,342 B2 | 8/2019 | Imm et al. | | |
| 10,444,856 B1* | 10/2019 | Wang | ...................... | G06F 3/023 |
| 10,537,795 B2* | 1/2020 | Bristol | .................... | A63F 13/25 |
| 2002/0114153 A1 | 8/2002 | Chan et al. | | |
| 2002/0130844 A1* | 9/2002 | Natoli | .................. | G10H 1/0008 345/168 |
| 2002/0154038 A1 | 10/2002 | Houston | | |
| 2002/0171633 A1* | 11/2002 | Brinjes | ................ | G06F 3/0426 345/168 |
| 2003/0011573 A1 | 1/2003 | Villet et al. | | |
| 2003/0085866 A1 | 5/2003 | Bimber et al. | | |
| 2003/0159076 A1 | 8/2003 | Delisle et al. | | |
| 2003/0179540 A1* | 9/2003 | Suda | ....................... | H01H 13/70 361/679.08 |
| 2004/0007116 A1* | 1/2004 | Marcus | .................. | G10H 1/344 84/10 |
| 2004/0056781 A1 | 3/2004 | Rix et al. | | |
| 2004/0206615 A1* | 10/2004 | Aisenbrey | ............ | H01H 13/785 200/262 |
| 2005/0063757 A1* | 3/2005 | Sugimura | ............... | H04M 1/23 400/472 |
| 2005/0123333 A1* | 6/2005 | Sugimura | ............ | H01H 25/002 400/485 |
| 2005/0150362 A1* | 7/2005 | Uehara | ................. | G10H 1/0066 84/645 |
| 2005/0167251 A1* | 8/2005 | Sugimura | ............. | H01H 25/008 200/5 R |
| 2006/0000694 A1* | 1/2006 | Nishino | ................. | H01H 3/122 200/5 A |
| 2006/0034043 A1 | 2/2006 | Hisano et al. | | |
| 2006/0092170 A1 | 5/2006 | Bathiche et al. | | |
| 2007/0013662 A1 | 1/2007 | Fauth | | |
| 2007/0025792 A1* | 2/2007 | Motoe | ................... | G06F 1/1662 400/472 |
| 2007/0103430 A1 | 5/2007 | Nishi | | |
| 2007/0159453 A1 | 7/2007 | Inoue | | |
| 2008/0092087 A1 | 4/2008 | Brown et al. | | |
| 2008/0266439 A1* | 10/2008 | Okazaki | ............. | H04N 5/23216 348/333.01 |
| 2009/0079593 A1* | 3/2009 | Yamakawa | ........... | G06F 3/0202 341/22 |
| 2009/0079698 A1* | 3/2009 | Takashima | ............ | G06F 3/0362 345/169 |
| 2009/0103250 A1* | 4/2009 | Takashima | ............ | H05K 9/00 361/679.02 |
| 2009/0223794 A1 | 9/2009 | Lee et al. | | |
| 2010/0060647 A1* | 3/2010 | Brown | .................... | G06T 13/40 345/473 |
| 2010/0090964 A1 | 4/2010 | Soo et al. | | |
| 2010/0225588 A1 | 9/2010 | Newton et al. | | |
| 2010/0238119 A1* | 9/2010 | Dubrovsky | ......... | G06F 3/04886 345/169 |
| 2010/0259482 A1* | 10/2010 | Ball | ....................... | G06F 3/041 345/168 |
| 2010/0309130 A1* | 12/2010 | Zhao | .................. | H03K 17/9622 345/168 |

(56) References Cited

U.S. PATENT DOCUMENTS

| | | | |
|---|---|---|---|
| 2010/0328109 A1* | 12/2010 | Taniguchi | G06F 3/0338 341/22 |
| 2011/0002724 A1* | 1/2011 | Sauvage | H01H 3/125 400/495 |
| 2011/0006980 A1* | 1/2011 | Taniguchi | G06F 3/0338 345/156 |
| 2011/0050464 A1 | 3/2011 | Tsai | |
| 2011/0074739 A1* | 3/2011 | Kikin-Gil | G06F 3/0488 345/176 |
| 2011/0214053 A1* | 9/2011 | Scott | G06F 3/04895 715/259 |
| 2012/0235912 A1* | 9/2012 | Laubach | G06F 3/04812 345/163 |
| 2012/0242581 A1 | 9/2012 | Laubach | |
| 2012/0249587 A1* | 10/2012 | Anderson | G02B 27/017 345/633 |
| 2012/0326961 A1 | 12/2012 | Bromer | |
| 2012/0327001 A1 | 12/2012 | Higginson | |
| 2012/0328349 A1* | 12/2012 | Isaac | G06F 3/04886 400/491 |
| 2013/0046544 A1 | 2/2013 | Kay et al. | |
| 2013/0082951 A1* | 4/2013 | Tanaka | G06F 3/041 345/173 |
| 2013/0199357 A1* | 8/2013 | Soejima | G09B 15/00 84/467 |
| 2013/0275907 A1 | 10/2013 | Lau et al. | |
| 2014/0014486 A1* | 1/2014 | Knighton | H01H 13/52 200/5 A |
| 2014/0035819 A1 | 2/2014 | Griffin | |
| 2014/0116867 A1* | 5/2014 | Leong | H01H 13/14 200/513 |
| 2014/0203953 A1* | 7/2014 | Moser | G06F 3/016 341/27 |
| 2014/0241780 A1* | 8/2014 | Knighton | G06F 3/0235 400/473 |
| 2014/0247219 A1* | 9/2014 | Pedersen | G06F 3/0202 345/168 |
| 2014/0327621 A1* | 11/2014 | Faggin | G06F 3/0202 345/168 |
| 2014/0346025 A1* | 11/2014 | Hendren | H01H 13/85 200/513 |
| 2015/0061901 A1* | 3/2015 | Casparian | H01H 13/705 341/22 |
| 2015/0170854 A1* | 6/2015 | Nishino | H01H 13/14 200/5 A |
| 2015/0193008 A1* | 7/2015 | Bolender | G06F 3/03547 345/168 |
| 2015/0293592 A1 | 10/2015 | Cheong et al. | |
| 2015/0348726 A1* | 12/2015 | Hendren | H01H 13/7073 200/513 |
| 2015/0355723 A1* | 12/2015 | Nakura-Fan | G06F 3/0325 345/168 |
| 2016/0012745 A1* | 1/2016 | Olsen | G09B 13/04 434/227 |
| 2016/0018985 A1* | 1/2016 | Bennet | G06F 3/011 345/175 |
| 2016/0147310 A1 | 5/2016 | Pate | |
| 2016/0337199 A1* | 11/2016 | Degioanni | H04L 43/045 |
| 2017/0010847 A1 | 1/2017 | Bernstein et al. | |
| 2017/0011210 A1 | 1/2017 | Cheong et al. | |
| 2017/0123492 A1 | 5/2017 | Marggraff et al. | |
| 2017/0170826 A1* | 6/2017 | Henty | G06F 1/1669 |
| 2017/0206691 A1 | 7/2017 | Harrises et al. | |
| 2017/0256096 A1* | 9/2017 | Faaborg | G06T 19/20 |
| 2017/0262045 A1 | 9/2017 | Rouvinez et al. | |
| 2017/0293351 A1 | 10/2017 | Li | |
| 2017/0315620 A1* | 11/2017 | Johri | G06F 3/0233 |
| 2017/0315621 A1 | 11/2017 | Yao | |
| 2017/0315627 A1 | 11/2017 | Yao | |
| 2017/0315722 A1 | 11/2017 | Yao | |
| 2018/0004304 A1* | 1/2018 | Moseley | G06F 3/0202 |
| 2018/0004305 A1* | 1/2018 | Moseley | G06F 3/0338 |
| 2018/0059819 A1* | 3/2018 | Moseley | G06F 3/044 |
| 2018/0068808 A1* | 3/2018 | Wang | G06F 1/1656 |
| 2018/0069550 A1* | 3/2018 | Lehmann | H01H 13/48 |
| 2018/0107284 A1* | 4/2018 | Hou | G06F 3/0202 |
| 2018/0129322 A1* | 5/2018 | Sah | H03K 17/955 |
| 2018/0173323 A1 | 6/2018 | Harvey et al. | |
| 2019/0056794 A1* | 2/2019 | Goldberg | G06F 3/0202 |
| 2019/0073003 A1* | 3/2019 | Xu | G06F 3/04886 |
| 2019/0094982 A1* | 3/2019 | Imm | G06F 3/0219 |
| 2019/0115169 A1* | 4/2019 | Kano | G06F 1/1681 |
| 2019/0294258 A1* | 9/2019 | Forlines | G06F 3/0234 |
| 2020/0103981 A1* | 4/2020 | Hsu | H01H 13/7065 |

OTHER PUBLICATIONS

Halbert, Aaron, "PCB vs. Plate Mounted Keyboards: What's the Difference?", URL: https://www.keychatter.com/2015/02/12/pcb-vs-plate-mounted-keyboards-whats-the-difference/, Dec. 2, 2015, 3 pages.

Keim, Robert, "Introduction to Capacitive Touch Sensing", URL: https://www.allaboutcircuits.com/technical-articles/introduction-to-capacitive-touchsensing/, May 24, 2016, 6 pages.

Mills, Allison, "Physical Keyboards Make Virtual Reality Typing Easier", URL: https://phys.org/news/2017-05-physical-keyboards-virtual-reality-easier.html, May 8, 2017, 3 pages.

Wikipedia, "Capacitive Sensing", URL: https://en.wikipedia.org/wiki/Capacitive_sensing, Sep. 12, 2017, 4 pages.

Wikipedia, "Keyboard Technology", URL: https://en.wikipedia.org/wiki/Keyboard_technology, Sep. 13, 2017, 6 pages.

Wikipedia, "Fiducial Marker", URL: https://en.wikipedia.org/wiki/Fiducial_marker, Sep. 18, 2017, 5 pages.

* cited by examiner

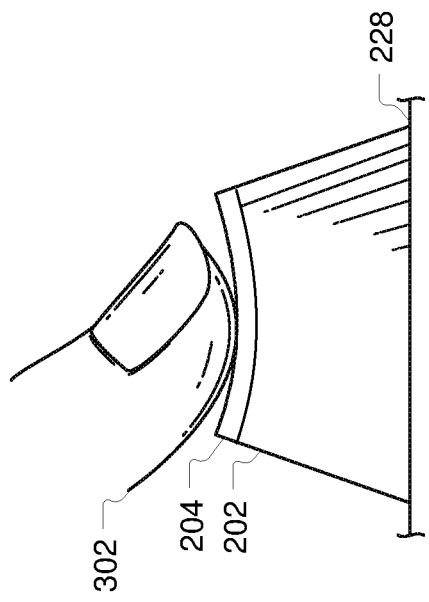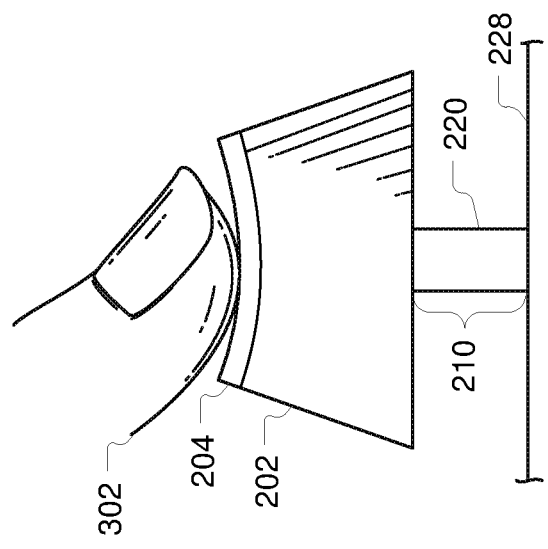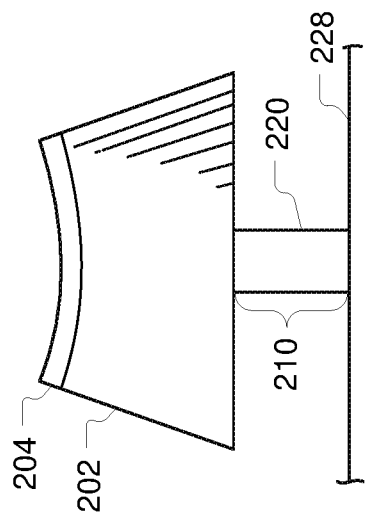

APPARATUSES, SYSTEMS, AND METHODS FOR REPRESENTING USER INTERACTIONS WITH REAL-WORLD INPUT DEVICES IN A VIRTUAL SPACE

CROSS REFERENCE TO RELATED APPLICATION

This application is a continuation of U.S. patent application Ser. No. 15/717,725, filed Sep. 27, 2017, the disclosure of which is incorporated, in its entirety, by this reference.

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation. Governments may use them for military training simulations, doctors may use them to practice surgery, and engineers may use them as visualization aids. Virtual reality headsets may also be used for productivity purposes. Information organization, collaboration, and privacy may all be enabled or enhanced through the use of virtual reality headsets.

Unfortunately, it may be difficult for users to interact with traditional computer input devices (e.g., keyboards, mice, trackballs, trackpads, etc.) while wearing virtual reality headsets because virtual reality headsets may prevent the users from seeing the input devices as they interact with them (e.g., by obstructing a line of sight between a user's eye and an input device). This lack of visual feedback may cause inefficiencies in user interaction with such traditional computer input devices while users are wearing virtual reality headsets. For example, users may type on a traditional keyboard at a significantly slower rate and/or may produce more errors while wearing a virtual reality headset because the virtual reality headset may prevent the users from seeing their fingers as they interact with the keyboard.

Hence, the instant disclosure identifies and addresses a need for apparatuses, systems, and methods that enable end-users to receive visual feedback while interacting with computer input devices.

SUMMARY

As will be described in greater detail below, the instant disclosure describes various apparatuses, systems, and methods for representing user interactions with real-world input devices in a virtual space. For example, the disclosed systems may provide visual feedback to users as they interact with real-world input devices (e.g., keyboards) while using a virtual reality headset.

In one example, an apparatus for representing user interactions with real-world input devices in virtual space may include a key assembly for a keyboard that includes a key cap. The key cap may include a touch sensor that is communicatively coupled to a control device. In some examples, when the touch sensor senses a touch event, the touch sensor may send a touch signal to the control device, and when the touch sensor senses an absence of touch, the touch sensor may send a control signal to the control device. The key assembly may further include a switch that is communicatively coupled to the control device and that is movable between a pressed position and an un-pressed position. In some examples, when the switch is in the pressed position, the switch may send a closed signal to the control device, and when the switch is in the un-pressed position, the switch may send an open signal to the control device.

In some embodiments, the key cap may further include (1) an interface surface that is coupled to the touch sensor and (2) a connector. In such embodiments, the switch may further include a plunger that is coupled to the connector and that is movable between an extended position and a compressed position. In at least one example, when the switch is in the pressed position, the plunger may be in the compressed position, and when the switch is in the un-pressed position, the plunger may be in the extended position. In some embodiments, the interface surface may define a concave depression that is adapted to receive a fingertip of a human finger. In at least one example, the touch sensor includes a sensing portion that at least partially covers the interface surface. In some examples, the touch sensor may be a capacitive touch sensor, and in some examples, the touch sensor may be a resistive touch sensor.

In addition, a corresponding virtual reality interface system for representing user interactions with real-world input devices in virtual space may include (1) a head-mounted display, (2) a control device that is communicatively coupled to the head-mounted display, and (3) a keyboard that includes at least one key assembly. The key assembly may include a key cap that includes a touch sensor that is communicatively coupled to the control device. In some examples, when the touch sensor senses a touch event, the touch sensor may send a touch signal to the control device, and when the touch sensor senses an absence of touch, the touch sensor may send a control signal to the control device. The key assembly may further include a switch that is communicatively coupled to the control device and that is movable between a pressed position and an un-pressed position. In some examples, when the switch is in the pressed position, the switch may send a closed signal to the control device, and when the switch is in the un-pressed position, the switch may send an open signal to the control device. In some examples, the touch sensor may be a capacitive touch sensor.

In some embodiments, the key cap may further include (1) an interface surface that is coupled to the touch sensor and (2) a connector. In such embodiments, the switch may further include a plunger that is coupled to the connector and that is movable between an extended position and a compressed position. In some examples, when the switch is in the pressed position, the plunger may be in the compressed position, and when the switch is in the un-pressed position, the plunger may be in the extended position. In some embodiments, the touch sensor may include a sensing portion that at least partially covers the interface surface, and in some embodiments, the interface surface may define a concave depression that is adapted to receive a fingertip of a human finger.

In some additional embodiments, the control device may receive, from the touch sensor, a touch sensor signal that may include one of (1) the touch signal and (2) the control signal. In such examples, the control device may also receive, from the switch, a switch signal that may include one of (1) the closed signal and (2) the open signal.

In some embodiments, the control device may direct the head-mounted display to present, in a virtual space, a visual representation of the key assembly. In such embodiments, the visual representation of the key assembly may be in the un-pressed position when the switch signal includes the open signal, and the visual representation of the key assembly may be in the pressed position when the switch signal includes the closed signal.

In some embodiments, the control device may further direct the head-mounted display to present, in the virtual space with the visual representation of the key assembly, a visual representation of a fingertip. In such embodiments, the visual representation of the fingertip may be in contact with a visual representation of the interface surface of the key cap when the touch sensor signal includes the touch signal, and the visual representation of the fingertip may be disconnected from the visual representation of the key cap when the touch sensor signal includes the control signal.

In some examples, the keyboard may include at least one additional key assembly that may be communicatively coupled to the control device. In such examples, the control device may receive an additional signal from the additional key assembly, and the visual representation of the key assembly and/or the visual representation of the fingertip may be further based on the additional signal.

In some embodiments, the keyboard may further include a mounting surface that includes a mounting location, and the switch may further include a mount that is coupled to the plunger and that is coupled to the mounting surface at the mounting location. In such embodiments, the control device may receive data representative of the mounting location, and the visual representation of the key assembly in the virtual space may be further based on the data representative of the mounting location.

In some embodiments, the keyboard may further include a physical position indicator. In such embodiments, the control device may determine (1) a position of the physical position indicator in a physical space and (2) a position of the keyboard in the virtual space based on the determination of the position of the physical position indicator in the physical space. The visual representation of the key assembly in the virtual space may then further be based on the determination of the position of the keyboard in the virtual space.

A corresponding method for representing user interactions with real-world input devices in virtual space may include sensing a touch event via a touch sensor included in a key cap that is included in a key assembly of a virtual reality interface system. The method may further include determining, while the touch sensor senses the touch event, that a switch included in the key assembly has moved from an un-pressed position to a pressed position. The method may additionally include directing, while the switch is in the pressed position and the touch sensor senses the touch event, a head-mounted display included in the virtual reality interface system to present, in a virtual space, a visual representation of the key assembly in the pressed position and a visual representation of a fingertip in contact with a visual representation of an interface surface of the key cap.

In some examples, the method may further include determining, while the touch sensor senses the touch event, that the switch has moved from the pressed position to the un-pressed position. In such examples, the method may further include directing, while the switch is in the un-pressed position and the touch sensor senses the touch event, the head-mounted display to present, in the virtual space, a visual representation of the key assembly in the un-pressed position and the visual representation of the fingertip in contact with the visual representation of the interface surface of the key cap.

In additional examples, the method may further include sensing, via the touch sensor, an absence of touch. In such examples, the method may further include directing, while the switch is in the un-pressed position and the touch sensor senses an absence of touch, the head-mounted display to present, in the virtual space, the visual representation of the key assembly in the un-pressed position and a visual representation of a fingertip disconnected from the interface surface of the key cap.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 3A through 3C illustrate cross-sectional side views of a key assembly accordance with some embodiments.

Figure 1:
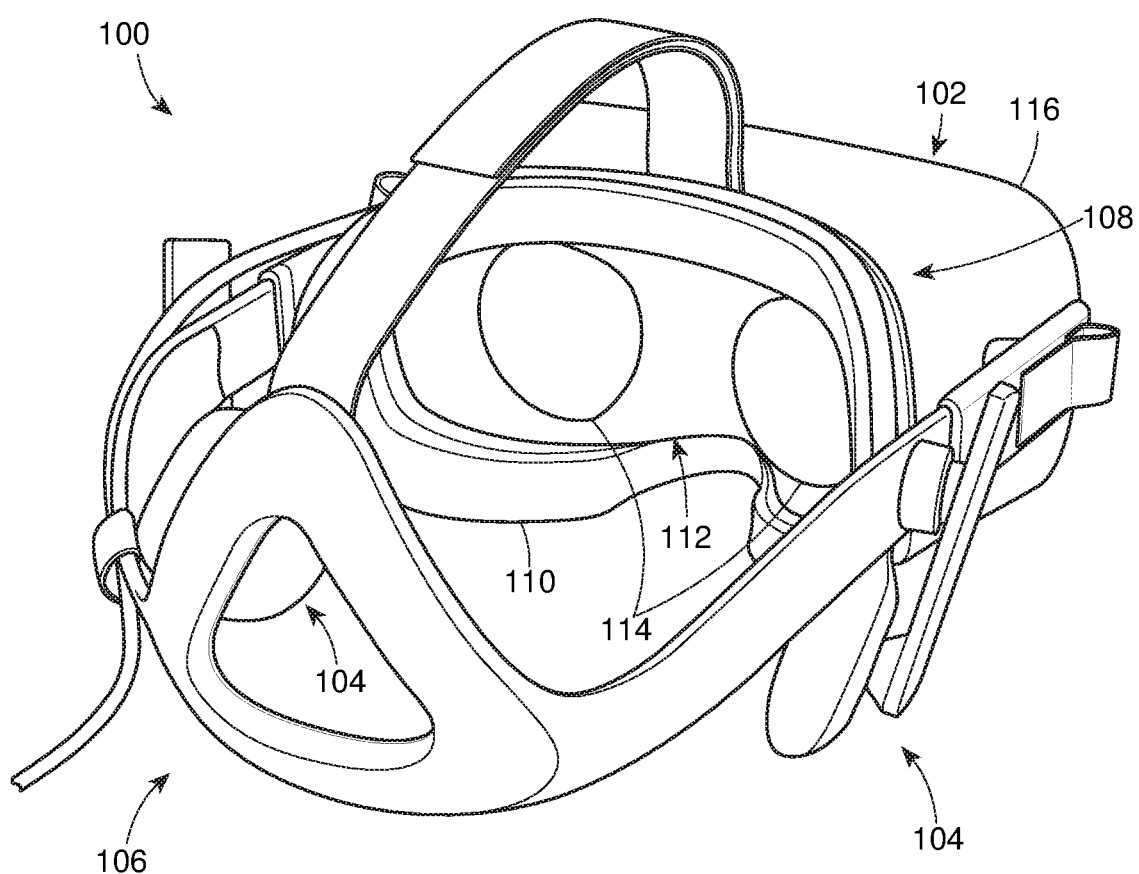
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for representing user interactions with real-world input devices in a virtual space. As will be explained in greater detail below, embodiments of the instant disclosure may provide visual feedback to a user of a virtual reality headset while the user also interacts with a real-world input device (e.g., a keyboard). An example key assembly may include both a touch sensor that may send, to a control device, a touch signal when it senses a touch event, and a control signal when it senses an absence of touch. The example key assembly may also include a switch that is movable (e.g., pressable) between a pressed position and an un-pressed position. When the switch is in the pressed position, the switch may send a closed signal to the control device, and when the switch is in the un-pressed position, the switch may send an open signal to the control device.

Based on these and other inputs, the control device may be able to determine a position of the user's fingertip relative to the example key assembly. The control device may then use these inputs to direct a head-mounted display (e.g., a virtual reality headset) to present or display a visual representation of the user's fingertip relative to the example key assembly within a virtual space. This may provide useful visual feedback to the user, and hence allow the user to more efficiently interact with a keyboard that includes the example key assembly while using the head-mounted display.

The following will provide, with reference to FIG. 1, examples of head-mounted-display systems. In addition, the discussion corresponding to FIGS. 2-8 will provide examples of various apparatuses and systems for representing user interactions with real-world input devices in a virtual space. Finally, the discussion corresponding to FIG. 9 will provide examples of methods for representing user interactions with real-world input devices in a virtual space.

FIG. 1 is a perspective view of a head-mounted-display system 100 in accordance with some embodiments. In some embodiments, head-mounted-display system 100 may include a head-mounted-display device 102 (i.e., head-mounted display), audio subsystems 104, a strap assembly 106, and a facial-interface system 108. The term "head-mounted display," as used herein, generally refers to any type or form of display device or system that is worn on or about a user's head and displays visual content to the user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI). Head-mounted-display device 102 may include a head-mounted-display housing 116 surrounding various components of head-mounted-display device 102, including lenses 114 and various electronic components, including display components as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, audio subsystems 104 may be integrated with head-mounted-display device 102 and may provide audio signals to the user's ears. Head-mounted-display system 100 may, for example, have two audio subsystems 104 located on the left and right sides of head-mounted-display system 100 to provide audio signals to the user's left and right ears, as shown in FIG. 1.

Strap assembly 106 may be used for adjustably mounting head-mounted-display device 102 on the user's head. As shown in FIG. 1, strap assembly 106 may include various straps, such as an upper strap and lower straps, that are coupled to head-mounted-display device 102 to adjustably conform to the top and/or sides of the user's head when the user is wearing head-mounted-display device 102.

In some embodiments, facial-interface system 108 may be configured to comfortably rest against a region of the user's face, including a region surrounding the user's eyes, when head-mounted-display system 100 is worn by the user. In these embodiments, facial-interface system 108 may include a facial interface 110 that contacts selected regions of the user's face. Facial interface 110 may surround a viewing region 112 that includes the user's field of vision while the user is wearing head-mounted-display system 100, allowing the user to look through lenses 114 of head-mounted-display device 102 without interference from outside light while the user is wearing head-mounted-display system 100.

Figure 2:
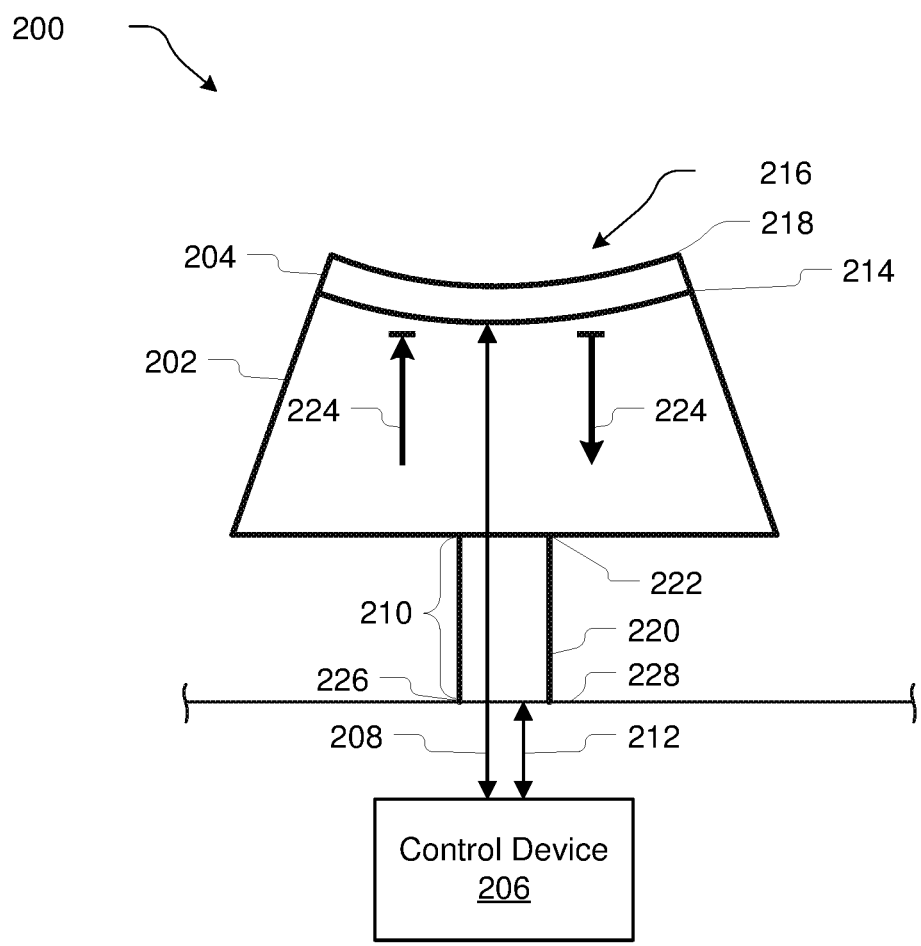
FIG. 2 is a cross-sectional side view of a key assembly in accordance with some embodiments.

FIG. 2 is a cross-sectional side view of an example key assembly 200 ("key assembly 200"). As shown, key assembly 200 may include a key cap 202 that includes a touch sensor 204. Touch sensor 204 may be communicatively coupled to control device 206 via a touch sensor connection 208. In this configuration, when touch sensor 204 senses a touch event (e.g., when a fingertip of a user touches touch sensor 204), the touch sensor sends a touch signal to control device 206. Additionally, when touch sensor 204 senses an absence of touch (e.g., when touch sensor 204 is not being touched by a fingertip of a user), touch sensor 204 sends a control signal to control device 206.

Touch sensor 204 may be any sensor capable of sensing a touch event and/or an absence of touch and that may send touch signals and control signals to control device 206. For example, touch sensor 204 may be a capacitive touch sensor that utilizes surface capacitance, projected capacitance, and/or any other suitable capacitive touch sensing technology to sense a touch event (e.g., a touch of a fingertip of a user). In other examples, touch sensor 204 may be a resistive touch sensor, an infrared touch sensor, and/or any other suitable touch sensor.

As further shown in FIG. 2, key assembly 200 may also include a switch 210 that is communicatively coupled to control device 206 via switch connection 212. As shown by movement indicators 224, switch 210 may be movable between a pressed position and an un-pressed position. In this configuration, when switch 210 is in the pressed position, switch 210 may send (e.g., via switch connection 212) a closed signal to control device 206. Additionally, when switch 210 is in the un-pressed position, switch 210 may send (e.g., via switch connection 212) an open signal to control device 206.

Switch 210 may represent any switch that is capable of being moved between a pressed position and an un-pressed position, and that may send open signals and closed signals to control device 206. Examples of switch 210 may include, but are not limited to, a mechanical switch, a membrane switch, a dome switch, a scissor switch, a buckling spring switch, a Hall-effect switch, an optical switch, and/or any other suitable switch.

As will be described in further detail below in reference to FIGS. 6-7, control device 206 may represent any suitable computing device that may receive one or more inputs from one or more sensors (e.g., touch sensor 204, switch 210, etc.) and that may perform one or more operations in response to and/or based on the input received from the one or more sensors. For example, control device 206 may receive, from touch sensor 204, a touch sensor signal that includes one of a touch signal and a control signal. Additionally or alternatively, control device 206 may receive, from switch 210, a switch signal that includes a closed signal and/or an open signal. Additional examples and explanations will be provided in reference to FIGS. 6-7 below.

Touch sensor connection 208 generally represents any medium or architecture capable of facilitating communication or data transfer from touch sensor 204 to control device 206. Likewise, switch connection 212 generally represents any medium or architecture capable of facilitating communication or data transfer from touch sensor 204 to control device 206. Touch sensor connection 208 and/or switch connection 212 may facilitate communication or data transfer using wireless and/or wired connections. Examples of touch sensor connection 208 and/or switch connection 212 may include, without limitation, a printed circuit board, a direct cable connection (e.g., USB, serial, APPLE LIGHTNING, APPLE THUNDERBOLT, HDMI, etc.), a Personal Area Network (PAN), a Local Area Network (LAN), an intranet, a Wide Area Network (WAN), the Internet, Power Line Communications (PLC), a cellular network (e.g., a Global System for Mobile Communications (GSM) network), portions of one or more of the same, variations or combinations of one or more of the same, and/or any other suitable connection.

In some embodiments, key cap 202 may also include an interface surface 214 that is coupled to touch sensor 204. Interface surface 214 may represent a surface of key cap 202 that may be coupled to a touch sensor (e.g., touch sensor 204). In some examples, the interface surface may define a concave depression 216 ("depression 216") that is adapted (e.g., dimensioned and/or sculpted) to receive a fingertip of a human finger. Such a depression may aid a user in positioning a fingertip on key cap 202.

Touch sensor 204 may include a sensing portion 218. Sensing portion 218 may represent any portion of touch sensor 204 that is sensitive to a touch event. Sensing portion 218 may be dimensioned to at least partially cover interface surface 214. In some embodiments, interface surface 214 may be entirely covered by sensing portion 218. Hence, in such embodiments, any contact a user's fingertip makes with interface surface 214 of key cap 202 may result in touch sensor 204 sensing a touch event.

In some embodiments, switch 210 may also include a plunger 220 that is coupled to key cap 202 via a connector 222. Plunger 220 may be movable between an extended position and a compressed position. As indicated by movement indicators 224, plunger 220 may be movable in a direction parallel to a longitudinal axis of key cap 202, and may be moved between an extended position and a compressed position. When the switch is in the pressed position, plunger 220 is in the compressed position, and when the switch is in the un-pressed position, plunger 220 is in the extended position. In some examples, switch 210 may further include a mount 226 that is coupled to plunger 220, and which may allow switch 210 to be mounted to a mounting surface 228.

Switch 210 may be associated with an actuation force and an actuation direction. An actuation force associated with switch 210 may represent an amount of force that may be applied to switch 210 before switch 210 may move from the un-pressed position to the pressed position. For example, switch 210 may have an associated actuation force of 60 centinewtons. Likewise, an actuation direction associated with switch 210 may be a direction relative to switch 210 in which the actuation force must be applied to switch 210 in order to cause switch 210 to move from the un-pressed position to the pressed position. When force that exceeds the associated actuation force is applied (e.g., by a fingertip of a user) to switch 210 (e.g., via key cap 202) in a direction parallel to an actuation direction of switch 210, switch 210 may move from the un-pressed position to the pressed position. In examples that include plunger 220, when such force is applied to switch 210, plunger 220 may also move from the extended position to the compressed position.

FIGS. 3A through 3C illustrate cross-sectional side views of key assembly 200 in various configurations. As shown in FIG. 3A, key assembly 200 is not being touched (e.g., by a fingertip of a user). Hence, in this configuration, touch sensor 204 may sense an absence of touch. Additionally, no force (i.e., a force that exceeds an actuation force associated with switch 210) is being applied to key cap 202 (e.g., by a fingertip of a user), and thus switch 210 is shown in the un-pressed position and plunger 220 is shown in the extended position. In this configuration, touch sensor 204 may send a control signal to control device 206 and switch 210 may send a closed signal to control device 206.

In FIG. 3B, a fingertip 302 of a user touches key cap 202 at touch sensor 204, but applies a force to key cap 202—and thus switch 210—that does not exceed an actuation force of switch 210. In this configuration, touch sensor 204 may sense a touch event (e.g., from fingertip 302), and therefore may send a touch signal to control device 206. However, switch 210 remains in the un-pressed position. Hence, switch 210 may send (or continue to send) the open signal to control device 206.

In FIG. 3C, fingertip 302 touches key cap 202 at touch sensor 204 and has applied a force to key cap 202 that has exceeded the actuation force of switch 210 in the actuation direction (i.e., toward mounting surface 228) of switch 210. The applied force has therefore caused switch 210 (obscured by key cap 202 in FIG. 3C) to move from the un-pressed position to the pressed position and plunger 220 to move from the extended position to the compressed position. In this configuration, touch sensor 204 may sense a touch event (e.g., from fingertip 302), and therefore may send a touch signal to control device 206. And, as switch 210 has moved from the un-pressed position to the pressed position, switch 210 may send a closed signal to control device 206.

Figure 4:
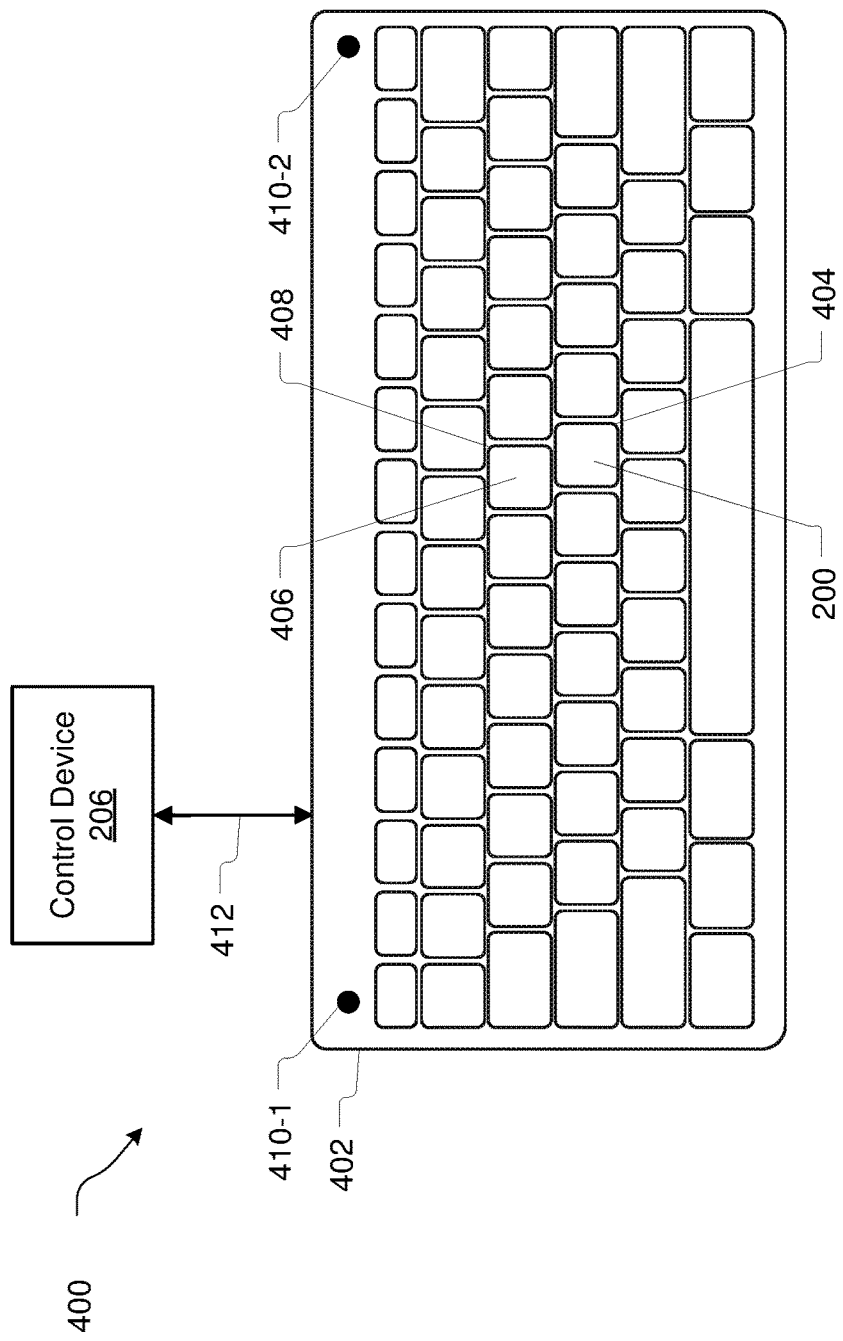
FIG. 4 is a top view of a keyboard that is included in a virtual reality interface system and that includes at least one key assembly in accordance with some embodiments.

In some embodiments, at least one key assembly 200 may be included in a keyboard that may be included in a virtual reality interface system. FIG. 4 is a top view of a keyboard 400 that may be included in a virtual reality interface system and that includes at least one key assembly 200. As shown, keyboard 400 may include a mounting surface 402. Mounting surface 402 may be any suitable mounting surface that may receive a mount included in key assembly 200 (e.g., mount 226). Additionally, mounting surface 402 may facilitate touch sensor connection 208 between touch sensor 204 and control device 206 and/or switch connection 212 between switch 210 and control device 206. For example, mounting surface 402 may include a printed circuit board that touch sensor 204 and/or switch 210 may be coupled to and that may facilitate transmission of one or more signals from touch sensor 204 and/or switch 210 to control device 206. In some examples, mounting surface 402 may include a rigid plate that may provide a more secure and/or robust mounting surface for key assembly 200.

As further shown in FIG. 4, key assembly 200 may be mounted (e.g., via mount 226) at a mounting location 404. Mounting location 404 may be any suitable mounting location on mounting surface 402. In some examples, mounting location 404 may correspond to a location of a key in a predetermined keyboard layout. For example, as shown in FIG. 4, and assuming that a layout of keyboard 400 corresponds to a QWERTY keyboard layout, mounting location 404 may correspond to a location of a "J" key. As another example, assuming the layout of keyboard 400 corresponds to a Dvorak keyboard layout, mounting location 404 may correspond to a location of an "H" key.

Keyboard 400 may include an additional key assembly 406 mounted at an additional mounting location 408. As with mounting location 404, additional mounting location 408 may be any suitable mounting location on mounting surface 402. Continuing with the previous examples, assuming the layout of keyboard 400 corresponds to a QWERTY keyboard layout, additional mounting location 408 may correspond to a "U" key, and assuming the layout of keyboard 400 corresponds to a Dvorak keyboard layout, additional mounting location 408 may correspond to a "G" key.

In some embodiments, keyboard 400 may include one or more additional sensors and/or indicators that may provide and/or facilitate providing additional information to control device 206 regarding a position of keyboard 400. For example, keyboard 400 may include one or more physical position indicators 410 (i.e., physical position indicator 410-1 and physical position indicator 410-2). As will be described in greater detail below in reference to FIG. 7, such physical position indicators may be used by a virtual reality interface system that includes keyboard 400 to determine a physical position and/or orientation of keyboard 400. Physical position indicators 410 may be any suitable fiducial markers that may be detected by a suitable camera. For example, when a virtual reality interface system that includes keyboard 400 also includes an infrared (IR) camera system, physical position indicators 410 may be IR LEDs and/or small dots of retro-reflective material. For a visible light camera system, physical position indicators 410 may include an easily-distinguishable color or intensity pattern.

In some embodiments, keyboard 400 may also include other sensors that may gather data regarding a position of keyboard 400 and communicate that data back to control device 206. Examples of such additional sensors may include, without limitation, gyroscopic sensors, accelerometers, altimeters, global positioning system devices, light sensors, audio sensors, power sensors, and/or any other sensor.

As shown, keyboard 400 may be communicatively coupled to control device 206 via keyboard connection 412. As with touch sensor connection 208 and switch connection 212, keyboard connection 412 generally represents any medium or architecture capable of facilitating communication or data transfer from keyboard 400 to control device 206. Keyboard connection 412 may facilitate communication or data transfer using wired and/or wireless connections. In some examples, keyboard connection 412 may facilitate any or all of the touch sensor connections and switch sensor connections of the key assemblies included in keyboard 400. Additionally or alternatively, keyboard connection 412 may facilitate a separate data connection for one or more additional components of keyboard 400. Examples of keyboard connection 412 may include, without limitation, a printed circuit board, a direct cable connection (e.g., USB, serial, APPLE LIGHTNING, APPLE THUNDERBOLT, HDMI, etc.), a PAN, a LAN, an intranet, a WAN, the Internet, PLC, a cellular network (e.g., a GSM network), portions of one or more of the same, variations or combinations of one or more of the same, and/or any other suitable connection.

As will be described in greater detail below in reference to FIG. 7, control device 206 may utilize data from the various touch sensors, switches, and other data gathering devices included in keyboard 400 to direct a head-mounted display included in a virtual reality interface system to present, in a virtual space, a visual representation of at least one key assembly and/or a visual representation of at least one fingertip. Additionally, control device 206 may utilize the provided data to present a visual representation of a user's hand or hands interacting with a virtual keyboard. In this and other ways, the apparatuses, systems, and methods described herein may represent user interactions with real-world input devices in a virtual space, thus providing visual feedback to a user while the user interacts with the real-world input devices.

Figure 5:
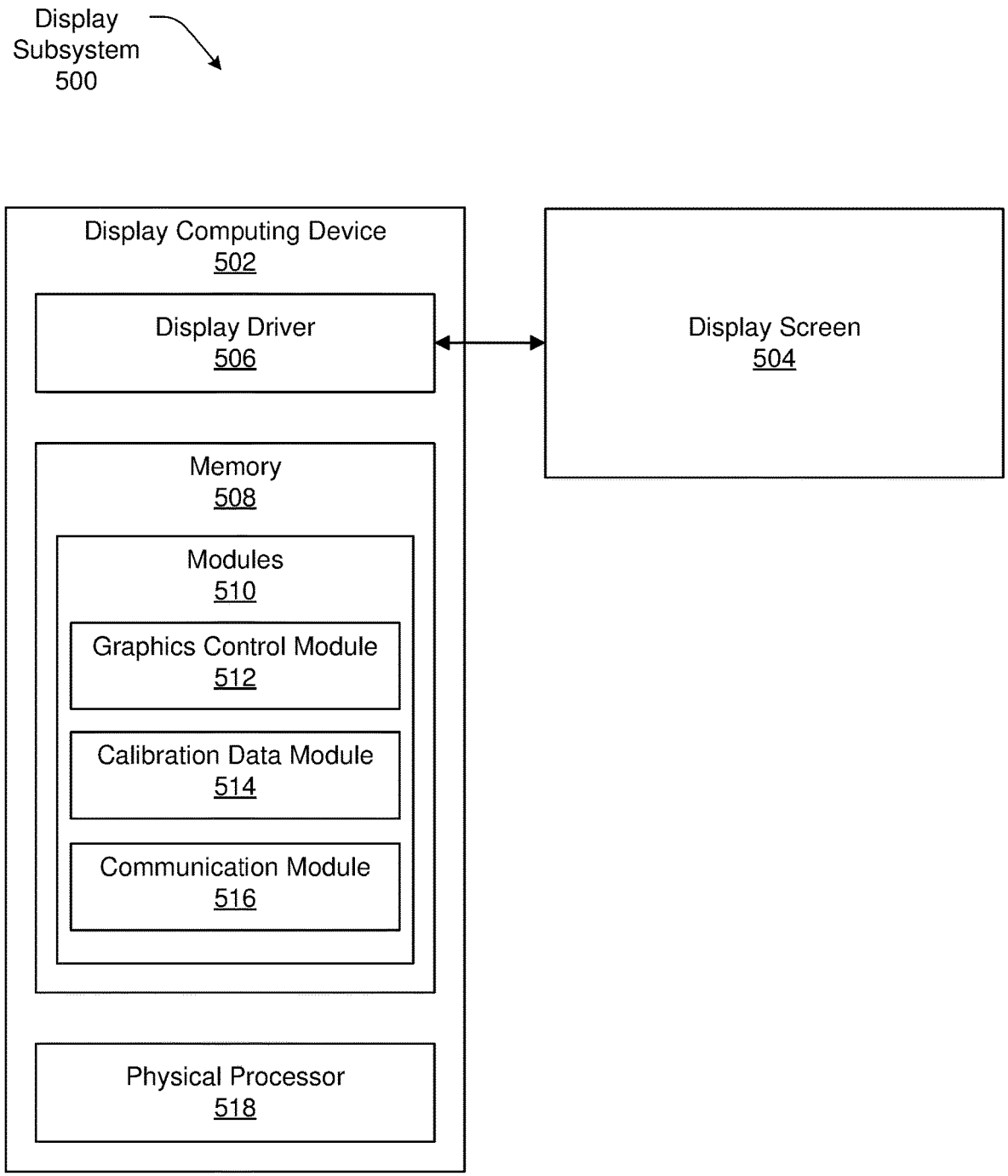
FIG. 5 is a block diagram of an exemplary display subsystem for representing user interactions with real-world input devices in a virtual space.

FIG. 5 illustrates an exemplary display subsystem 500 that may be directed (e.g., by control device 206) to perform various actions to represent user interactions with real-world input devices in a virtual space. As shown in FIG. 5, display subsystem 500 may include display computing device 502 for controlling display screen 504. In some embodiments, display subsystem 500 may include a plurality of displays, such as a pair of displays utilized in head-mounted-display device 102. For example, head-mounted-display device 102 may include a pair of display screens 504 that are each controlled by a separate display computing device 502. Additionally or alternatively, a pair of display screens 504 of head-mounted-display device 102 may both be controlled by a single display computing device 502.

According to at least one embodiment, display computing device 502 may include a display driver 506 for driving pixels of display screen 504. Display driver 506 may include any suitable circuitry for driving display screen 504. For example, display driver 506 may include at least one integrated circuit (IC). In some examples, display driver 506 may include timing controller (TCON) circuitry that receives image signals and generates horizontal and vertical timing signals for display screen 504. Display driver 506 may, for example, be mounted on an edge of a thin-film-transistor (TFT) substrate layer of display screen 504.

As illustrated in FIG. 5, example display subsystem 500 may also include one or more memory devices, such as memory 508. Memory 508 generally represents any type or form of volatile or non-volatile storage device or medium capable of storing data and/or computer-readable instructions. In one example, memory 508 may store, load, and/or maintain one or more of modules 510. Examples of memory 508 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Display subsystem 500 may also include one or more modules 510 for performing one or more display tasks. As shown in FIG. 5, display subsystem 500 may include a graphics control module 512 that provides display data and control signals to display driver 506 for producing images on display screen 504. Graphics control module 512 may include, for example, a video card and/or video adapter that is used to provide video data and/or display control signals to display screen 504. In some examples, video data may include text, graphics, images, moving video content, and/or any other suitable image content to be presented on display screen 504.

In at least one embodiment, display subsystem 500 may include a calibration data module 514 that stores and utilizes calibration data for display screen 504. For example, calibration data module 514 may include calibration data, such as correction factors, that are applied to video data utilized by display driver 506 to produce calibrated images on display screen 504.

Additionally, display subsystem 500 may include a communication module 516 that receives video data and/or calibration data from one or more computing devices. For example, communication module 516 may receive video data to be displayed on display screen 504 from any suitable video and/or image source. Communication module 516 may also, for example, receive calibration data from a display calibration system. In some examples, communication module 516 may also receive user input supplied by a user via an input-output device (e.g., touch screens, buttons, joysticks, click wheels, scrolling wheels, touch pads, key pads, keyboards, microphones, speakers, tone generators, position and/or orientation sensors, vibrators, cameras, sensors, light-emitting diodes and/or other status indicators, data ports, etc.) to display subsystem 500. In at least one example, communication module 516 may also send data from display subsystem 500 to external devices and/or to a user.

In certain embodiments, one or more of modules 510 in FIG. 5 may represent one or more software applications or programs that, when executed by a computing device, may cause the computing device to perform one or more tasks. For example, and as will be described in greater detail below, one or more of modules 510 may represent modules stored and configured to run on one or more computing devices (e.g., head-mounted-display device 102 shown in FIG. 1). One or more of modules 510 in FIG. 5 may also represent all or portions of one or more special-purpose computers configured to perform one or more tasks.

As illustrated in FIG. 5, example display subsystem 500 may also include one or more physical processors, such as physical processor 518. Physical processor 518 generally represents any type or form of hardware-implemented processing unit capable of interpreting and/or executing computer-readable instructions. In one example, physical processor 518 may access and/or modify one or more of modules 510 stored in memory 508. Additionally or alternatively, physical processor 518 may execute one or more of modules 510 to facilitate calibration of display screen 504. Examples of physical processor 518 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Display subsystem 500 may receive (e.g., from control device 206 via one or more modules 510) one or more instructions that may direct display subsystem 500 to display, via display screen 504, a visual representation of one or more user interface objects within a virtual space. Such user interface objects may include, without limitation, a key assembly, a keyboard, a fingertip, a hand, and so forth. By presenting these user interface objects by way of display screen 504 as directed by control device 206, display subsystem 500 may provide useful feedback regarding use of a real-world input device (e.g., keyboard 400) to a user while the user is wearing head-mounted display 102. Accordingly, display subsystem 500 may work in concert with control device 206 to represent user interactions with real-world input devices in a virtual space.

Figure 6:
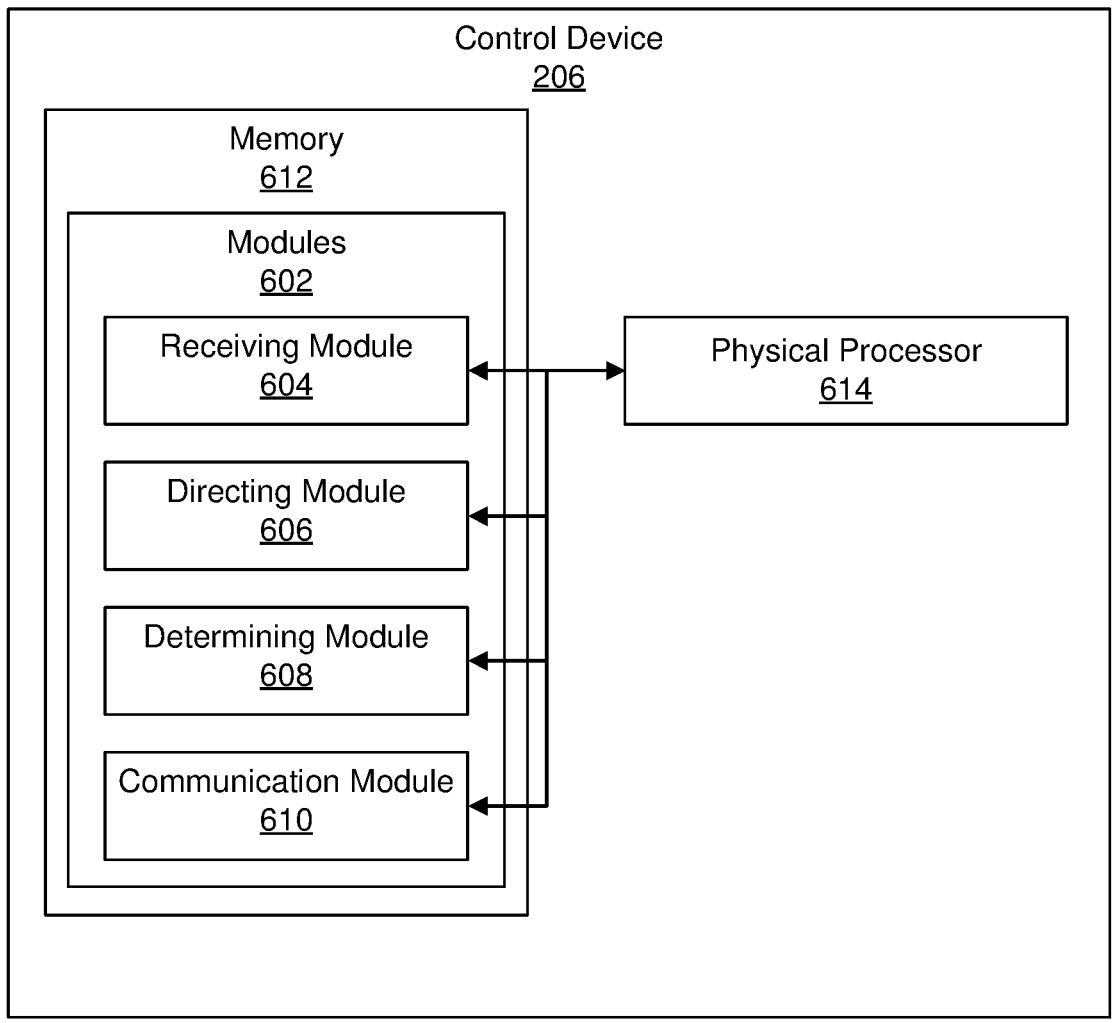
FIG. 6 is a block diagram of an exemplary control device for representing user interactions with real-world input devices in a virtual space.

FIG. 6 illustrates a block diagram of control device 206 that may facilitate representing user interactions with real-world input devices in a virtual space. As illustrated in this figure, control device 206 may include one or more modules 602 for performing one or more tasks. As will be described in greater detail below, modules 602 may include a receiving module 604 that receives, from touch sensor 204, a touch sensor signal that includes one of a touch signal and a control signal. Receiving module 604 may also receive, from switch 210, a switch signal that includes one of a closed signal and an open signal.

In addition, in some embodiments, receiving module 604 may receive signals in addition to the touch sensor signal and the switch signal. For example, in some embodiments, receiving module 604 may receive an additional signal (e.g., an additional touch signal, an additional switch signal, etc.) from an additional key assembly included in a keyboard (e.g., keyboard 400). Additionally, receiving module 604 may receive data representative of a mounting location of a key assembly within a mounting surface of a keyboard (e.g., keyboard 400), data representative of a position and/or orientation of a keyboard (e.g., keyboard 400), and any other data and/or signal that may serve a particular implementation.

As further shown in FIG. 6, modules 602 may further include a directing module 606 that directs a head-mounted display (e.g., head-mounted-display device 102) to present, in a virtual space, a visual representation of a key assembly (e.g., key assembly 200). Directing module 606 may direct the head-mounted display to present the visual representation of the key assembly in an un-pressed position when the switch signal includes the open signal, and in a pressed position when the switch signal includes the closed signal. Additionally, directing module 606 may direct the head-mounted display (e.g., head-mounted-display device 102) to present, in the virtual space with the visual representation of the key assembly, a visual representation of a fingertip. Directing module 606 may direct the head-mounted display to present the visual representation of the fingertip in contact with a visual representation of an interface surface of the key cap (e.g., interface surface 214) when the touch sensor signal includes the touch signal, and disconnected from the visual representation of the key cap when the touch sensor signal includes the control signal.

In some embodiments, as will be described in greater detail below, directing module 606 may direct display subsystem 500 to present the visual representation of the key cap and/or the visual representation of the fingertip based on additional data, such as additional data received from one or more other modules 602 (e.g., receiving module 604, determining module 608, and/or communication module 610). For example, in embodiments where receiving module 604 receives an additional signal from an additional key assembly included in a keyboard (e.g., keyboard 400), directing module 606 may base the visual representation of the key cap and/or the visual representation of the fingertip based on the additional signal from the additional key assembly.

In some embodiments, modules 602 may also include a determining module 608 that may determine a position of at least one physical position indicator included in a keyboard (e.g., keyboard 400) in a physical space. Determining module 608 may also determine a position of the keyboard in a virtual space based on the determination of the position of the physical position indicator in the physical space. Determining module 608 may perform these tasks in any suitable way, such as by calculating the position of the keyboard in the virtual space based on an observed position of the physical position indicators in the physical space. Additionally or alternatively, in some embodiments, determining module 608 may determine the position of the keyboard in the virtual space based on data gathered by one or more sensors included in a head-mounted-display system (e.g., head-mounted-display system 100) and/or one or more sensors included in a keyboard (e.g., keyboard 400). As will be explained in greater detail below, modules 602 may further include a communication module 610 that communicates with one or more devices, such as head-mounted-display system 100, keyboard 400, and/or display screen 504. In at least one example, communication module 610 may also send data from control device 206 to other external devices and/or to a user.

In certain embodiments, one or more of modules 602 in FIG. 6 may represent one or more software applications or programs that, when executed by subsystem 600, may cause subsystem 600 to perform one or more tasks. As illustrated in FIG. 6, subsystem 600 may also include one or more memory devices, such as memory 612.

Memory 612 generally represents any type or form of volatile or non-volatile storage device or medium capable of storing data and/or computer-readable instructions. In one example, memory 612 may store, load, and/or maintain one or more of modules 602.

Subsystem 600 may also include one or more physical processors, such as physical processor 614. Physical processor 614 generally represents any type or form of hardware-implemented processing unit capable of interpreting and/or executing computer-readable instructions. In one example, physical processor 614 may access and/or modify one or more of modules 602 stored in memory 612. Additionally or alternatively, physical processor 614 may execute one or more of modules 602 to facilitate representing user interactions with real-world input devices in a virtual space.

Although illustrated as separate computing devices herein, in some implementations display computing device 502 and control device 206 may share one or more components and/or functions. For example, in some implementations, functions performed by physical processor 518 may be performed by physical processor 614 and/or one or more functions performed by physical processor 614 may be performed by physical processor 518. Additionally or alternatively, one or more modules 510 may be stored in memory 612, and/or one or more modules 602 may be stored in memory 508.

Figure 7:
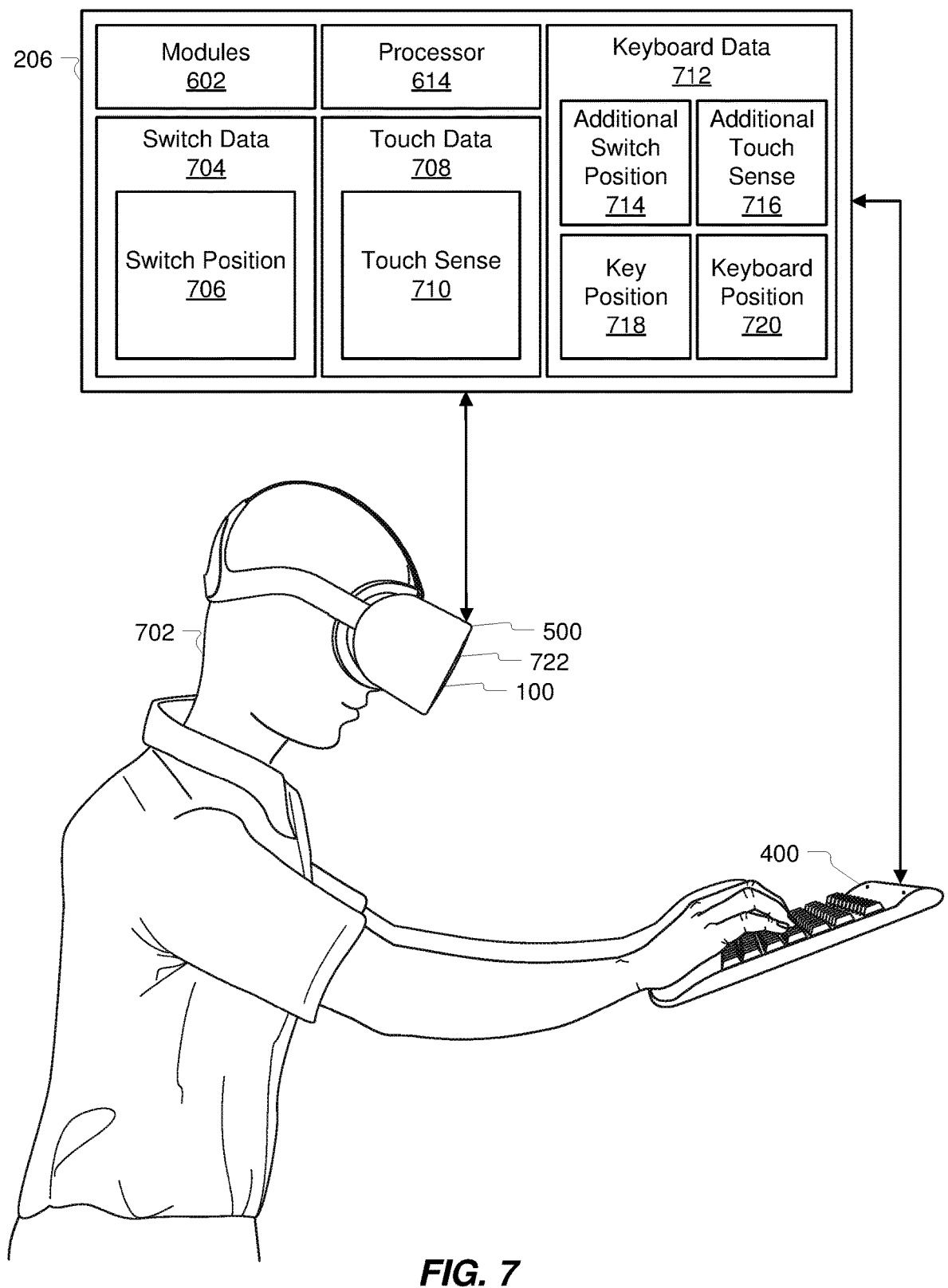
FIG. 7 is a block diagram of an exemplary system for representing user interactions with real-world input devices in a virtual space.

FIG. 7 illustrates an exemplary virtual reality interface system 700 for representing user interactions with real-world input devices in a virtual space. As shown, virtual reality interface system 700 may include head-mounted-display system 100, shown in FIG. 7 as being worn by a user 702. Virtual reality interface system 700 may also include a keyboard 400. Keyboard 400 may be communicatively coupled to control device 206, which may include modules 602 and physical processor 614.

Although not shown expressly in FIG. 7, as described above, keyboard 400 may include key assembly 200. Key assembly 200 may include key cap 202 that may include touch sensor 204 that is communicatively coupled (e.g., via touch sensor connection 208) to control device 206. When touch sensor 204 senses a touch event (e.g., from a fingertip of user 702), touch sensor 204 may send a touch signal to control device 206. When touch sensor 204 senses an absence of touch (e.g., user 702 is not touching touch sensor 204), touch sensor 204 may send a control signal to control device 206.

Key assembly 200 may also include a switch 210 that may be communicatively coupled (e.g., via switch connection 212) to control device 206, and that may be movable between a pressed position and an un-pressed position. When switch 210 is in the pressed position (e.g., user 702 is pressing switch 210), switch 210 may send a closed signal to control device 206. When switch 210 is in the un-pressed position, switch 210 may send an open signal to control device 206.

As mentioned above, control device 206 may receive via one or more modules 602 (e.g., receiving module 604) switch data 704 that indicates switch position 706 from switch 210 and touch data 708 that indicates touch sense 710 from touch sensor 204. From the combination of switch position 706 and touch sense 710, one or more modules 602 may be able to construct a model for displaying, via display screen 504, a relationship between key assembly 200 and a fingertip in a virtual space.

For example, when switch position 706 indicates that switch 210 is in the open position (i.e., when switch position 706 includes an open signal from switch 210), one or more modules 602 (e.g., directing module 606) may direct (e.g., via display subsystem 500) display screen 504 to present, in a virtual space, a visual representation of key assembly 200 where key assembly 200 is in the un-pressed position. Additionally, when switch position 706 indicates that switch 210 is in the closed position (i.e., when switch position 706 includes a closed signal from switch 210), one or more of modules 602 may direct display screen 504 to present, in the virtual space, a visual representation of key assembly 200 where key assembly 200 is in the closed position.

As another example, when touch sense 710 indicates that touch sensor 204 is being touched (e.g., when touch sense 710 includes a touch signal), one or more modules 602 (e.g., directing module 606) may direct (e.g., via display subsystem 500) display screen 504 to present, in a virtual space, a visual representation of a fingertip where the fingertip is in contact with a visual representation of interface surface 214. This may cause the visual representation of the fingertip to appear as if it is resting on and/or pressing the visual representation of the key assembly. Additionally, when touch sense 710 indicates that touch sensor 204 is not being touched (i.e., when touch sense 710 includes a control signal), one or more modules 602 may direct display screen 504 to present, in the virtual space, a visual representation of the fingertip where the fingertip is disconnected from the visual representation the key assembly. This may cause the visual representation of the fingertip to appear as if it is hovering above and/or preparing to press the visual representation of the key cap.

Control device 206 may also receive keyboard data 712 that includes data regarding additional attributes of elements of keyboard 400. For example, as mentioned above, in addition to key assembly 200, keyboard 400 may also include an additional key assembly 406 that may also be communicatively coupled to control device 206. Control device 206 may receive an additional switch position 714 and an additional touch sense 716 from additional key assembly 406, and may further base the visual representation of the key assembly and the visual representation of the key cap in the virtual space on the additional switch position and the additional touch sense. For example, when additional touch sense 716 indicates that additional key assembly 406 is being touched (i.e., when additional touch sense includes a touch signal from a touch sensor of additional key assembly 406), the visual representation of the fingertip may appear as if it is not hovering above and/or preparing to press the visual representation of the key cap. Additionally or alternatively, the visual representation of the fingertip may appear as if it is in contact with an interface surface of a key cap of additional key assembly 406.

In at least one embodiment, keyboard 400 may include mounting surface 402, with key assembly 200 mounted at mounting location 404. Control device 206 may receive (e.g., via receiving module 604) data representative of mounting location 404 as key position 718, and may further base the representation of the key assembly in the virtual space on key position 718. For example, if key position 718 indicates that a layout of keyboard 400 corresponds to a QWERTY keyboard layout and that mounting location 404 corresponds to a location of a "J" key, the visual representation of key assembly 200 in the virtual space may indicate that key assembly 200 is a "J" key. Hence, a visual representation of a fingertip in the virtual space may appear to be interacting with (e.g., pressing, not pressing, waiting to press, moving relative to, etc.) a "J" key.

In some examples, keyboard 400 also includes at least one physical position indicator 410. Control device 206 may determine (e.g., via one or more of modules 602, such as determining module 608) a position of at least one physical position indicator 410 in a physical space, and then use that determined position of physical position indicator 410 in the physical space to determine a position of keyboard 400 in the virtual space, and store that position of the keyboard in the virtual space as keyboard position 720.

Control device 206 may determine a position of physical position indicator 410 in a physical space in a variety of ways. For example, head-mounted-display system 100 may include a camera 722. Camera 722 may be configured to detect particular wavelengths of light that may be produced and/or directed toward camera 722 by at least one of physical position indicator 410. Head-mounted-display system 100 may transmit that camera data to control device 206 via a suitable wired and/or wireless connection. Based on the camera data, one or more modules 602 of control device 206 may be able to calculate a physical position of physical position indicator 410 in a physical space relative to camera 722, and thus a physical position of keyboard 400 relative to camera 722 in the physical space. Control device 206 may then store the calculated physical position of keyboard 400 relative to camera 722 and/or head-mounted-display system 100 as keyboard position 720.

One or more modules 602 (e.g., directing module 606, determining module 608, etc.) may then further base the visual representation of key assembly 200 in the virtual space on keyboard position 720. For example, when keyboard position 720 indicates a position of keyboard 400 in a physical space, and key position 718 indicates that key assembly 200 is located on keyboard 400 at a position of a "J" key, control device 206 may direct, via one or more of modules 602, display screen 504 to present the visual representation of key assembly 200 in the virtual space at a position relative to keyboard 400 and/or one or more of physical position indicators 410 corresponding to a "J" key.

In some embodiments, control device 206 may direct display screen 504, via display subsystem 500, to present additional elements in the virtual space. For example, in some examples, keyboard 400 may include a plurality of key assemblies that each provide switch data, touch data, and key position data to control device 206. Based on this aggregate data, control device 206 may determine positions of and render keys, keyboards, fingers, hands, and other objects within the virtual space.

Figure 8:
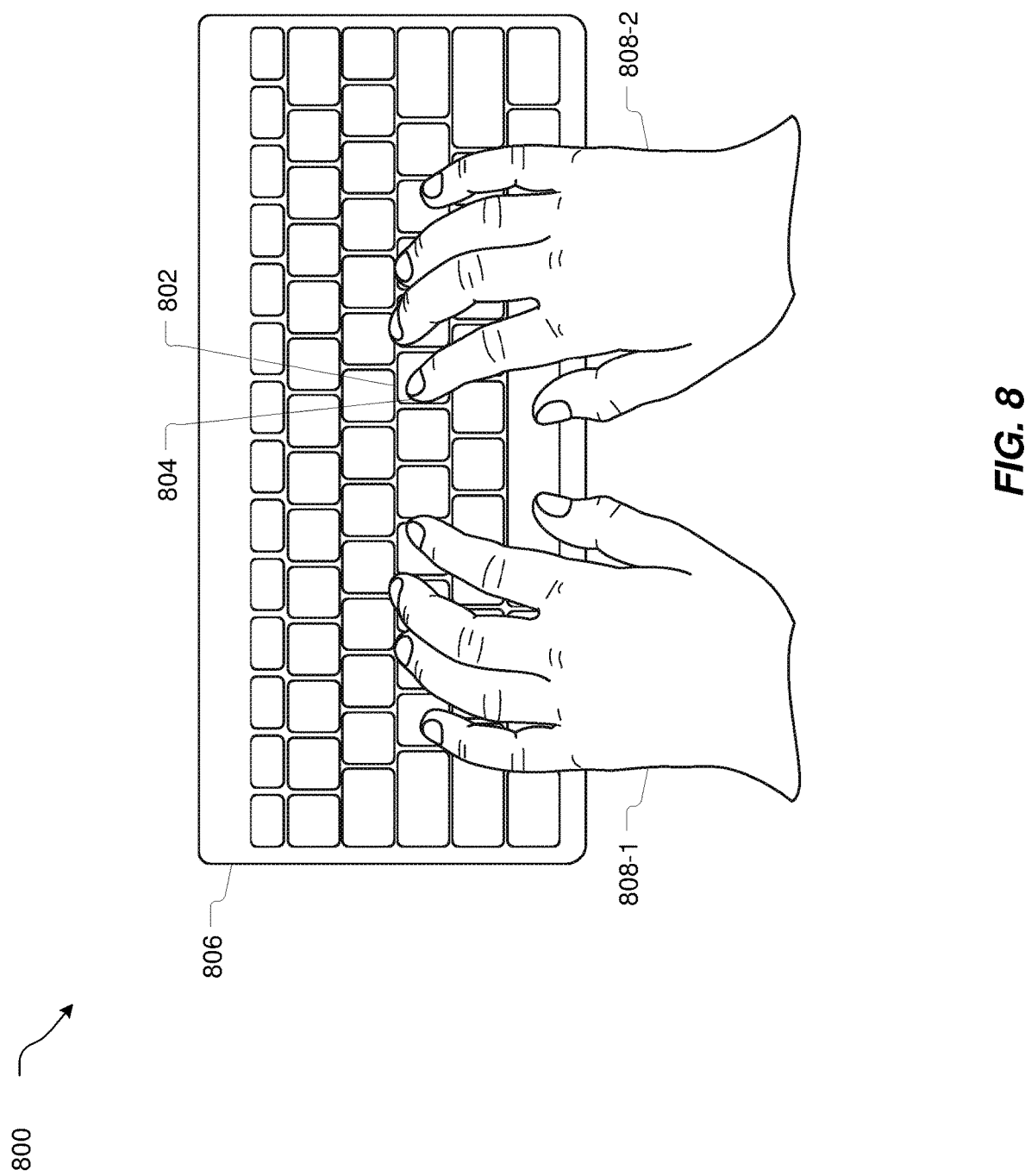
FIG. 8 is a view of a visual representation of a key assembly and a visual representation of a fingertip in a virtual space in accordance with some embodiments.

FIG. 8 is a view of a visual representation of a key assembly and a visual representation of a fingertip in a virtual space in accordance with some embodiments. As shown, FIG. 8 shows a virtual space 800 that includes a virtual key assembly 802 and a virtual fingertip 804. As user 702 touches and/or refrains from touching key assembly 200 (i.e., touches and/or refrains from touching touch sensor 204), virtual fingertip 804 may appear to contact and disconnect from virtual key assembly 802. As user 702 presses key assembly 200 (i.e., moves switch 210 between the pressed and un-pressed positions), virtual key assembly 802 moves between the pressed and un-pressed positions. This may provide visual feedback to user 702 as he or she interacts with key assembly 200. For example, as user 702 presses (e.g., actuates) key assembly 200, virtual fingertip 804 may appear to press virtual key assembly 802. When the user releases key assembly 200, virtual fingertip 804 may appear to release virtual key assembly 802. Furthermore, if user 702 merely rests his or her fingertip on key assembly 200, virtual fingertip 804 may also appear to rest on (e.g., touch but not press) virtual key assembly 802.

As shown, virtual space 800 also includes a virtual keyboard 806 and virtual hands 808. As mentioned above, in some embodiments, some or all of the keys on keyboard 400 may be key assemblies similar to key assembly 200, and each may provide corresponding touch and/or switch data to control device 206. Combined with keyboard data 712, control device 206 may use this aggregate data to present virtual keyboard 806 in the virtual space, and animate virtual hands 808 that reflect positioning of and/or movements of the fingertips and/or hands of user 702 as he or she interacts with keyboard 400. This may provide useful feedback to user 702 that may allow user 702 to more efficiently interact with keyboard 400 while using head-mounted-display system 100.

Figure 9:
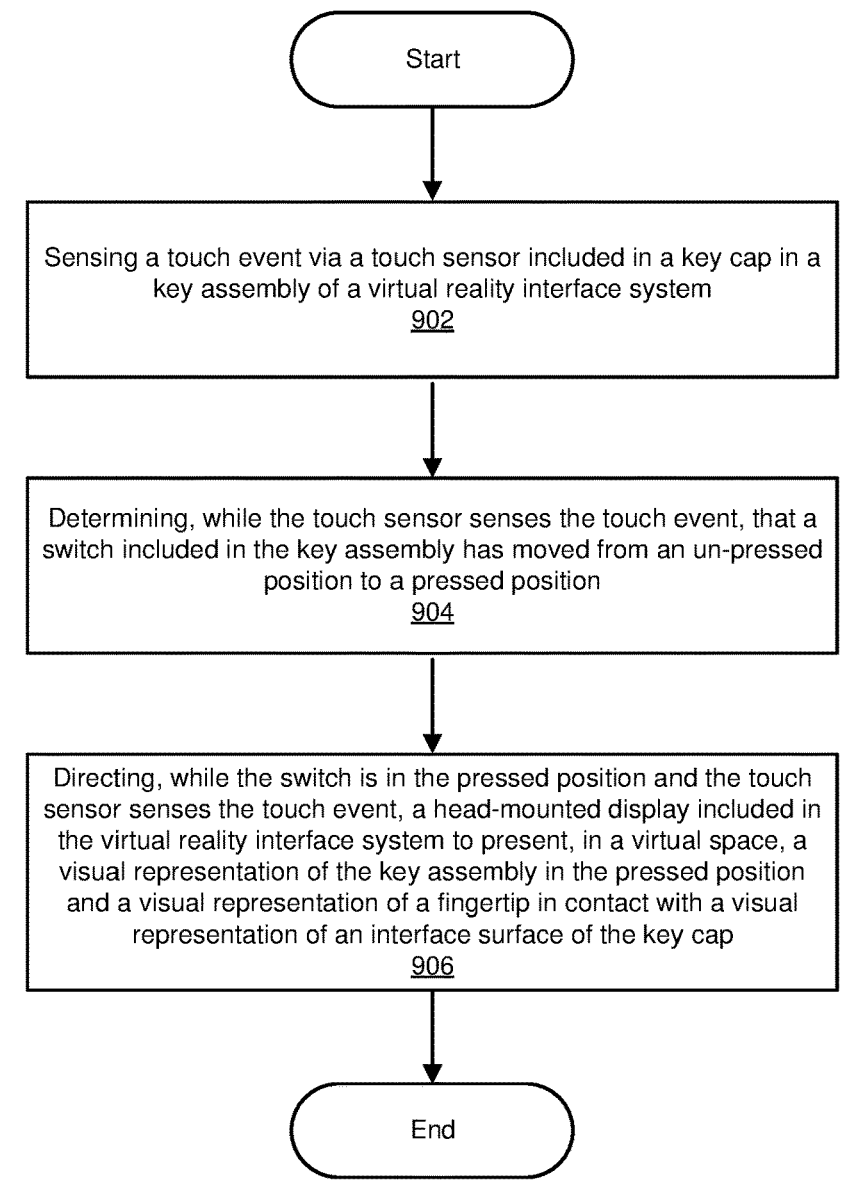
FIG. 9 is a block diagram of an exemplary method for representing user interactions with real-world input devices in a virtual space.

FIG. 9 is a flow diagram of an exemplary computer-implemented method 900 for representing user interactions with real-world input devices in a virtual space. The operations shown in FIG. 9 may be performed by any suitable computer-executable code and/or computing system, including display subsystem 500 in FIG. 5, control device 206 in FIG. 6, virtual reality interface system 700 in FIG. 7, and/or variations or combinations of the same. In one example, each of the steps shown in FIG. 9 may represent an algorithm whose structure includes and/or is represented by multiple sub-steps, examples of which will be provided in greater detail below.

As illustrated in FIG. 9, at operation 902 one or more of the systems and/or apparatuses described herein may sense a touch event via a touch sensor included in a key cap included in a key assembly of a virtual reality interface system. The systems and/or apparatuses described herein may perform this operation in any of the ways described herein. For example, as described above, a user (e.g., user 702) may touch a touch sensor 204 included in key cap 202 included in key assembly 200 of virtual reality interface system 700. This may cause one or more of modules 602

(e.g., receiving module 604, directing module 606, determining module 608, etc.) to sense, via touch sensor 204, a touch event.

At operation 904 in FIG. 9, one or more of the systems and/or apparatuses described herein may determine, while a touch sensor senses a touch event, that a switch included in a key assembly of a virtual reality interface system has moved from an un-pressed position to a pressed position. The systems and/or apparatuses described herein may perform this operation in any of the ways described herein. For example, a user (e.g., user 702) may, while touching touch sensor 204, press key cap 202 in an actuation direction and with an actuation force associated with switch 210. This may cause switch 210 to move from the un-pressed position to the pressed position. One or more modules 602 (e.g., receiving module 604, directing module 606, determining module 608, etc.) may then determine, while touch sensor 204 senses the touch event, that switch 210 has moved from the un-pressed position to the pressed position.

At operation 906 in FIG. 9, one or more of the systems and/or apparatuses described herein may direct, while the switch is in the pressed position and the touch sensor senses the touch event, a head-mounted display included in the virtual reality interface system to present, in a virtual space, a visual representation of the key assembly in the pressed position and a visual representation of a fingertip in contact with a visual representation of an interface surface of the key cap. The systems and/or apparatuses described herein may perform this operation in any of the ways described herein. For example, directing module 606 may direct, while switch 210 is in the pressed position and touch sensor 204 senses the touch event, display screen 504 included in head-mounted-display system 100 to present, in a virtual space (e.g., virtual space 800), a visual representation of the key assembly (e.g., virtual key assembly 802) in the pressed position and a visual representation of a fingertip (e.g., virtual fingertip 804) in contact with a visual representation of an interface surface of the key cap.

According to some embodiments, one or more of the systems and/or apparatuses described herein may also determine, while the touch sensor senses the touch event, that the switch has moved from the pressed position to the un-pressed position. The systems and/or apparatuses described herein may perform this operation in any of the ways described herein. For example, a user (e.g., user 702) may move switch 210 from the pressed position to the un-pressed position while continuing to touch touch sensor 204. One or more modules 602 (e.g., receiving module 604, determining module 608, etc.) may then determine, while touch sensor 204 senses the touch event, that switch 210 has moved from the pressed position to the un-pressed position.

One or more of the systems and/or apparatuses described herein may then direct, while the switch is in the un-pressed position and the touch sensor senses the touch event, the head-mounted display to present, in the virtual space, a visual representation of the key assembly in the un-pressed position and the visual representation of the fingertip in contact with the visual representation of the interface surface of the key cap. The systems and/or apparatuses described herein may perform this operation in any of the ways described herein. For example, directing module 606 may direct, while switch 210 is in the un-pressed position and touch sensor 204 senses the touch event, display screen 504 included in head-mounted-display system 100 to present, in the virtual space (e.g., virtual space 800), a visual representation of the key assembly (e.g., virtual key assembly 802) in the un-pressed position and the visual representation of the fingertip (e.g., virtual fingertip 804) in contact with the visual representation of the interface surface of the key cap.

According to some embodiments, one or more of the systems and/or apparatuses described herein may also sense, via the touch sensor, an absence of touch. The systems and/or apparatuses described herein may perform this operation in any of the ways described herein. For example, a user (e.g., user 702) may refrain from touching touch sensor 204. This may cause one or more of modules 602 (e.g., receiving module 604, determining module 608, etc.) to sense, via touch sensor 204, an absence of touch.

One or more of the systems and/or apparatuses described herein may then direct, while the switch is in the un-pressed position and the touch sensor senses an absence of touch, the head-mounted display to present, in the virtual space, the visual representation of the key assembly in the un-pressed position and a visual representation of a fingertip disconnected from the interface surface of the key cap. The systems and/or apparatuses described herein may perform this operation in any of the ways described herein. For example, directing module 606 may direct, while switch 210 is in the un-pressed position and touch sensor senses an absence of touch, display screen 504 included in head-mounted-display system 100 to present, in virtual space 800, the visual representation of the key assembly (e.g., virtual key assembly 802) in the un-pressed position and a visual representation of a fingertip (e.g., virtual fingertip 804) disconnected from the interface surface of the key cap.

As discussed throughout the instant disclosure, the disclosed apparatuses, systems, and methods may provide one or more advantages over traditional virtual reality interface systems. For example, the apparatuses, systems, and methods disclosed herein may, by detecting whether a user is touching and/or actuating a switch included in an exemplary key assembly, direct a head-mounted display (e.g., a virtual reality headset) to present a visual representation of the user's interaction with the key assembly within a virtual space. This may provide useful visual feedback to the user, and hence allow the user to more efficiently interact with a keyboard that includes the key assembly while using the head-mounted display. This may also increase a user's productivity while using the head-mounted display, and increase user satisfaction with the head-mounted display and/or the virtual reality interface system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor to be transformed, transform the sensor, output a result of the transformation to render a visual representation of a fingertip interacting with a key assembly in a virtual space, use the result of the transformation to present the visual representation of the fingertip interacting with the key assembly in the virtual space by way of a head-mounted display, and store the result of the transformation to manipulate, animate, and/or adjust the visual representation of the fingertip interacting with the key assembly in the virtual space. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A key assembly for a keyboard, the key assembly comprising:
    a key cap comprising:
        a touch sensor communicatively coupled to a control device; and
        a switch communicatively coupled to the control device and movable between a pressed position and an un-pressed position, the switch comprising a plunger that is movable between an extended position and a compressed position;
    wherein:
        when the switch is in the pressed position, the plunger is in the compressed position and the switch sends a closed signal to the control device;
        when the switch is in the un-pressed position, the plunger is in the extended position; and
        the control device:
            receives, from the switch upon the switch moving from the un-pressed position to the pressed position, a switch signal comprising the closed signal; and
            directs a head-mounted display to animate, at a virtual location in a virtual space corresponding to a real-world location of the key assembly and in real-time relative to the switch moving from the un-pressed position to the pressed position, a visual representation of a fingertip moving a visual representation of the key assembly from the un-pressed position to the pressed position.

2. The key assembly of claim 1, wherein the touch sensor comprises a capacitive touch sensor.

3. The key assembly of claim 1, wherein the touch sensor comprises a resistive touch sensor.

4. The key assembly of claim 1, wherein:
    when the touch sensor senses a touch event, the touch sensor sends a touch signal to the control device; and
    when the touch sensor senses an absence of touch, the touch sensor sends a control signal to the control device.

5. The key assembly of claim 1, wherein:
    when the switch is in the un-pressed position, the plunger is in the extended position and the switch sends an open signal to the control device; and
    the switch signal further comprises at least one of:
        the closed signal; or
        the open signal.

6. The key assembly of claim 1, wherein the key cap further comprises an interface surface that is coupled to the touch sensor.

7. The key assembly of claim 6, wherein the interface surface defines a concave depression that is adapted to receive a fingertip of a human finger.

8. The key assembly of claim 6, wherein the touch sensor comprises a sensing portion that at least partially covers the interface surface.

9. A virtual reality interface system comprising:
    a head-mounted display;
    a control device communicatively coupled to the head-mounted display; and
    a keyboard comprising at least one key assembly comprising:
        a key cap comprising:
            a touch sensor communicatively coupled to the control device; and
            a switch communicatively coupled to the control device and movable between a pressed position and an un-pressed position, the switch comprising a plunger that is movable between an extended position and a compressed position;
    wherein:
        when the switch is in the pressed position, the plunger is in the compressed position and the switch sends a closed signal to the control device; and
        when the switch is in the un-pressed position, the plunger is in the extended position; and
        the control device:
            receives, from the switch upon the switch moving from the un-pressed position to the pressed position, a switch signal comprising the closed signal; and
            directs the head-mounted display to animate, at a virtual location in a virtual space corresponding to a real-world location of the key assembly and in real-time relative to the switch moving from the un-pressed position to the pressed position, a visual representation of a fingertip moving a visual representation of the key assembly from the un-pressed position to the pressed position.

10. The virtual reality interface system of claim 9, wherein the touch sensor comprises a capacitive touch sensor.

11. The virtual reality interface system of claim 9, wherein the key cap further comprises an interface surface that is coupled to the touch sensor.

12. The virtual reality interface system of claim 11, wherein the touch sensor comprises a sensing portion that at least partially covers the interface surface.

13. The virtual reality interface system of claim 11, wherein the interface surface defines a concave depression that is adapted to receive a fingertip of a human finger.

14. The virtual reality interface system of claim 11, wherein:
when the touch sensor senses a touch event, the touch sensor sends a touch signal to the control device; and
when the touch sensor senses an absence of touch, the touch sensor sends a control signal to the control device; and
the control device receives, from the touch sensor, a touch sensor signal comprising at least one of:
the touch signal; or
the control signal.

15. The virtual reality interface system of claim 14, wherein:
the keyboard comprises at least one additional key assembly that is communicatively coupled to the control device;
the control device receives an additional signal from the additional key assembly; and
at least one of the visual representation of the key assembly and the visual representation of the fingertip is further based on the additional signal.

16. The virtual reality interface system of claim 14, wherein the visual representation of the key assembly is in the pressed position when the switch signal includes the closed signal.

17. The virtual reality interface system of claim 16, wherein:
the visual representation of the fingertip is in contact with a visual representation of the interface surface of the key cap when the touch sensor signal includes the touch signal; and
the visual representation of the fingertip is disconnected from the visual representation of the key cap when the touch sensor signal includes the control signal.

18. A method comprising:
sensing a touch event via a touch sensor included in a key cap included in a key assembly of a virtual reality interface system;
determining, while the touch sensor senses the touch event, that a switch included in the key assembly has moved from an un-pressed position to a pressed position; and
directing, while the touch sensor senses the touch event, a head-mounted display included in the virtual reality interface system to animate, at a virtual location in a virtual space corresponding to a real-world location of the key assembly and in real-time relative to the switch moving from the un-pressed position, based on sensing the touch event and determining that the switch has moved from the un-pressed position to the pressed position, a visual representation of a fingertip moving a visual representation of the key assembly from the un-pressed position to the pressed position.

19. The method of claim 18, further comprising:
determining, while the touch sensor senses the touch event, that the switch has moved from the pressed position to the un-pressed position; and
directing, while the switch is in the un-pressed position and the touch sensor senses the touch event, the head-mounted display to present, in the virtual space, a visual representation of the key assembly returning to the un-pressed position with the visual representation of the fingertip in contact with the visual representation of the key cap.

20. The method of claim 19, further comprising:
sensing, via the touch sensor, an absence of touch; and
directing, while the switch is in the un-pressed position and the touch sensor senses the absence of touch, the head-mounted display to present, in the virtual space, the visual representation of the key assembly in the un-pressed position and the visual representation of a fingertip disconnected from the key cap.

* * * * *